(12) United States Patent
Frank et al.

(10) Patent No.: US 8,699,687 B2
(45) Date of Patent: *Apr. 15, 2014

(54) METHODS, SYSTEMS, AND COMPUTER PROGRAM PRODUCTS FOR PROVIDING AUTOMATED CALL ACKNOWLEDGEMENT AND ANSWERING SERVICES

(75) Inventors: Scott M. Frank, Dunwoody, GA (US); Robert A. Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1164 days.

This patent is subject to a terminal disclaimer.

(21) Appl. No.: 11/313,991

(22) Filed: Dec. 20, 2005

(65) Prior Publication Data

US 2006/0098792 A1 May 11, 2006

Related U.S. Application Data

(63) Continuation-in-part of application No. 10/666,512, filed on Sep. 18, 2003, now Pat. No. 7,587,039.

(51) Int. Cl.
*H04M 3/42* (2006.01)
(52) U.S. Cl.
USPC ................................ 379/211.01; 379/201.01
(58) Field of Classification Search
USPC ............. 379/201.01, 211.01–211.02, 212.01, 379/93.15, 52, 142.14–142.15, 215.01, 379/88.13; 455/466, 556.1, 412.1
See application file for complete search history.

(56) References Cited

U.S. PATENT DOCUMENTS

| | | | |
|---|---|---|---|
| 4,197,526 A * | 4/1980 | Levine et al. ................. | 340/7.22 |
| 5,563,938 A | 10/1996 | Soshea et al. | |
| 5,742,905 A | 4/1998 | Pepe et al. | |
| 5,872,841 A * | 2/1999 | King et al. ............... | 379/210.01 |
| 5,898,668 A | 4/1999 | Shaffer | |
| 6,035,018 A * | 3/2000 | Kaufman .................... | 379/88.17 |
| 6,266,399 B1 * | 7/2001 | Weller et al. ............... | 379/88.19 |
| 6,347,085 B2 | 2/2002 | Kelly | |
| 6,363,065 B1 | 3/2002 | Thornton et al. | |
| 6,389,005 B1 | 5/2002 | Cruickshank | |
| 6,510,219 B1 | 1/2003 | Wellard et al. | |
| 6,631,181 B1 * | 10/2003 | Bates et al. ................. | 379/88.18 |
| 6,724,872 B1 * | 4/2004 | Moore et al. ............... | 379/93.35 |
| 7,224,774 B1 * | 5/2007 | Brown et al. ............... | 379/88.14 |
| 7,248,676 B2 * | 7/2007 | Visser et al. ............... | 379/88.21 |
| 7,558,251 B1 * | 7/2009 | Huang et al. .................. | 370/352 |
| 7,587,039 B1 * | 9/2009 | Koch ....................... | 379/211.01 |
| 7,657,289 B1 * | 2/2010 | Levy et al. .................... | 455/563 |
| 8,037,150 B2 * | 10/2011 | Weaver et al. ................. | 709/207 |
| 2003/0063732 A1 * | 4/2003 | Mcknight ................ | 379/210.01 |
| 2004/0018830 A1 * | 1/2004 | Pugliese ....................... | 455/418 |

(Continued)

OTHER PUBLICATIONS

U.S. Appl. No. 10/184,789, filed Jun. 28, 2002.

*Primary Examiner* — William Deane, Jr.
(74) *Attorney, Agent, or Firm* — Cantor Colburn LLP

(57) ABSTRACT

A method, system, and computer program product for responding to an incoming communication attempt, sent from a sender to a recipient. The method includes receiving the incoming communication attempt and presenting options for responding to the incoming communication attempt. The options include at least one of acknowledgement message options and communication answering-related options. The method also includes receiving an option selection and responding to the incoming communication attempt according to the instructions of the selected option. The acknowledgement message options provide information to the sender without requiring that the recipient answer the incoming communication attempt.

22 Claims, 9 Drawing Sheets

(56) References Cited

U.S. PATENT DOCUMENTS

| | | |
|---|---|---|
| 2004/0120494 A1* | 6/2004 | Jiang et al. ............... 379/210.01 |
| 2004/0146145 A1* | 7/2004 | Kiser et al. ................ 379/88.16 |
| 2004/0174983 A1* | 9/2004 | Olschwang et al. .......... 379/377 |
| 2005/0060532 A1* | 3/2005 | Dorenbosch et al. ......... 713/100 |
| 2005/0226398 A1* | 10/2005 | Bojeun ..................... 379/93.15 |
| 2006/0165058 A1* | 7/2006 | Caballero-McCann et al. ............................ 370/352 |
| 2007/0248221 A1* | 10/2007 | Chatterjee et al. ....... 379/211.02 |
| 2008/0082421 A1* | 4/2008 | Onyon et al. ................... 705/14 |
| 2008/0215691 A1* | 9/2008 | Chhatrapati et al. .......... 709/206 |
| 2009/0154665 A1* | 6/2009 | Galvin et al. .............. 379/88.17 |

* cited by examiner

_US 8,699,687 B2_

METHODS, SYSTEMS, AND COMPUTER PROGRAM PRODUCTS FOR PROVIDING AUTOMATED CALL ACKNOWLEDGEMENT AND ANSWERING SERVICES

CROSS REFERENCE TO RELATED APPLICATIONS

This application is a continuation-in-part of U.S. application Ser. No. 10/666,512, filed Sep. 18, 2003, now U.S. Pat. No. 7,587,039, the contents of which are incorporated herein by reference in its entirety.

BACKGROUND

The present invention relates generally to voice and digital communications services, and more particularly, the invention relates to a method, system, and computer program product for providing automated call acknowledgement and answering services over a communications network.

The growing popularity of the Internet and the associated Internet protocol (IP) technology has carried over to the cellular industry which has embraced IP as the networking architecture of choice for creating and implementing new applications and service offerings. Recent trends toward open, packet-based wireless technology has facilitated an extraordinary expansion of global, wireless subscribers which continues to grow each year.

This third-generation (3G) technology provides network operators and third-party content and service providers with vast potential for delivering new services and value-added content to mobile cellular subscribers that can be personalized in ways never before thought possible.

While the increase in mobile communications has provided great flexibility and convenience for the subscriber, it has also created the need for improvements. For example, a subscriber of telephony services often finds that incoming communications come through at inopportune moments, such as while driving in a car, sitting in a meeting, or while the subscriber is otherwise occupied. However, the subscriber, while not in a position to answer the communication, would still like to acknowledge to the sender that the communication attempt was observed and communicate to the sender information without engaging in an immediate conversation. The increase in traffic accidents by drivers distracted while talking on cell phones and the recent legislation restricting cell phone usage on the road is evidence of the need for additional service options for the mobile device user.

In most situations, the called party has two choices: answer the communication attempt or allow the communication attempt to go unanswered. There are circumstances that arise, however, whereby the caller is not able to answer the communication attempt and has no other option but to let the communication attempt pass. With caller identification service, the called party may be aware of who is initiating the communication attempt but has no way of acknowledging the communication attempt or the caller without physically answering the communication attempt.

What is needed, therefore, is a convenient way to acknowledge to a caller that the called party is aware of the communication attempt and to communicate information as to how or when the two parties may alternatively communicate, perhaps at a future time, without physically answering the communication attempt. Further, what is needed is a convenient way to provide communication acknowledgement options to the receiving party as to how to reply to an observed incoming communication attempt other than the conventional method of answering a voice call or otherwise responding in a manner so as to converse with the sender in real-time through other means such as text-based conversation. Communication acknowledgement options are options for a response to an incoming communication attempt that result in no immediate two-way discussion between two parties. These options include: (1) sending a customized voice reply to an incoming communication attempt and (2) automatically scheduling an alternate time to converse.

Further, what is needed is a convenient way to provide communication answering options to the receiving party as to how to reply to an observed incoming communication attempt. Communication answering options are options for a response to an incoming communication attempt that result in an immediate two-way interaction between at least two parties. These options include: (1) using an incoming communication attempt to initiate an interactive real-time communication session between two parties in disparate communication modes, (2) using an incoming communication attempt to initiate another interactive application between the parties such as a shared gaming experience or other shared application, (3) using an incoming communication attempt to initiate a closed captioning text presentation and recording of a voice conversation, and (4) using an incoming communication attempt to initiate dual mode multiple disassociated conversations.

BRIEF SUMMARY

Exemplary embodiments relate to a method, system, and computer program product for responding to an incoming communication attempt, sent from a sender to a recipient. The method includes receiving the incoming communication attempt and presenting options for responding to the incoming communication attempt. The options include at least one of acknowledgement message options and communication answering-related options. The method also includes receiving an option selection and responding to the incoming communication attempt according to the instructions of the selected option. The acknowledgement message options provide information to the sender without requiring that the recipient answer the incoming communication attempt.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Existing communications systems allow called parties two choices; that is, either to answer or not answer an incoming communication attempt. The automated call acknowledgement and answering services provide additional options to a called party, allowing him/her to acknowledge an incoming communication attempt, and optionally, to provide instructions as to how the two parties may communicate at a future time. Acknowledgement messages may include general "boilerplate" statements or may include customized, pre-defined statements defined by the called party. Acknowledgement messages can be text or voice-based statements depending upon the type of communications devices utilized by the parties placing the calls. In addition, the automated call acknowledgement features include sending a customized voice reply to an incoming communication attempt and automatically scheduling an alternate time to converse. Further, call answering services are provided that include options for responding to an incoming communication attempt. These options include: (1) using an incoming communication attempt to initiate an interactive real-time communication session between two parties in disparate communication modes, (2) using an incoming communication attempt to initiate another interactive application between the parties such as a shared gaming experience or other shared application, (3) using an incoming communication attempt to initiate a closed captioning text presentation and recording of a voice conversation, and (4) using an incoming communication attempt to initiate dual mode multiple disassociated conversations.

Figure 1:
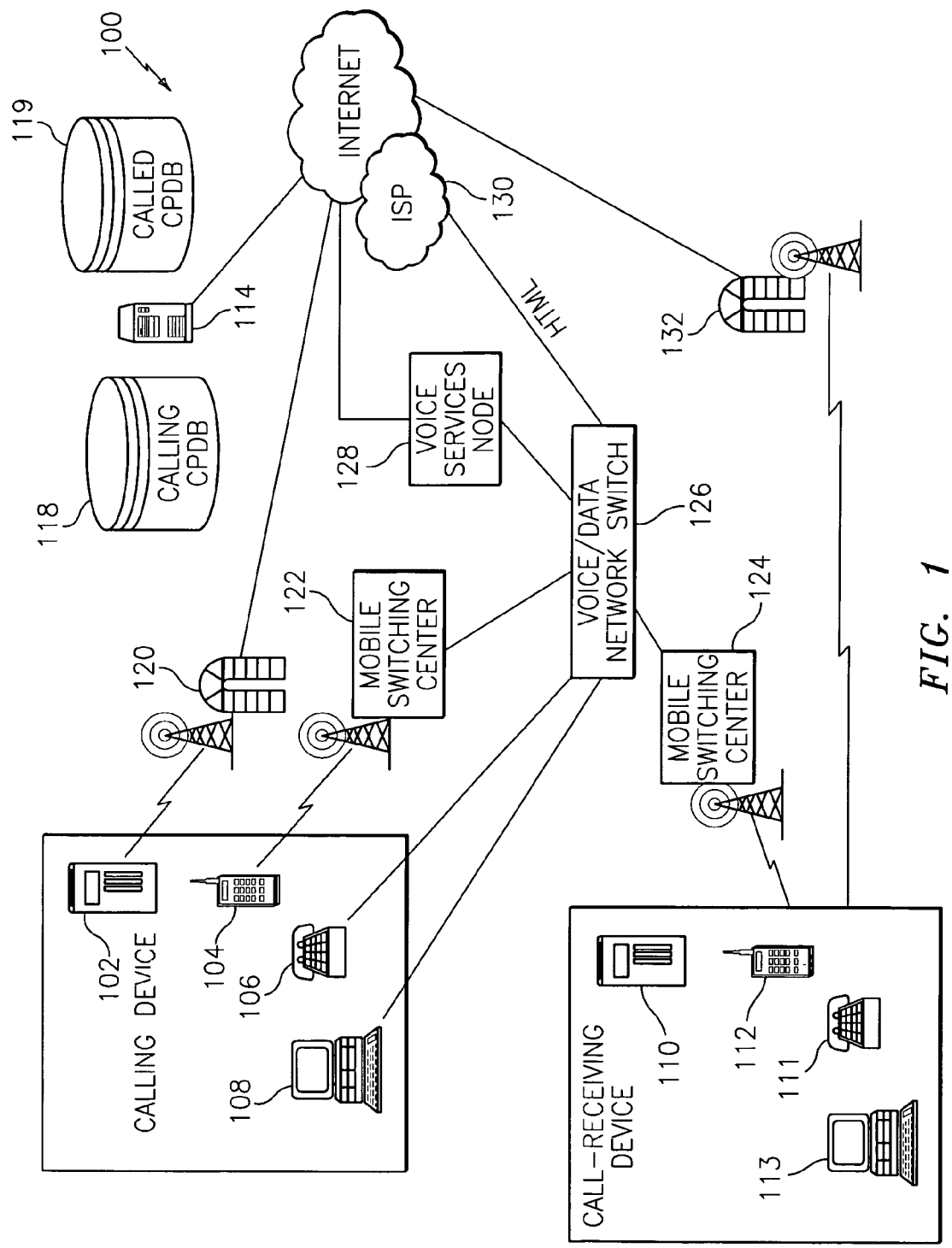
FIG. 1 is a block diagram of a system upon which the automated call acknowledgement service is implemented in an exemplary embodiment.

The automated call acknowledgement service is executed via a communications network as shown in the system 100 of FIG. 1. FIG. 1 depicts a variety of communications devices for which the automated call acknowledgement and answering services may be applied. A calling party initiates a communications attempt using a calling device such as one of calling devices 102-108. Calling devices shown in FIG. 1 include a pager 102, a cell phone 104, wireline telephone 106, and a personal computer 108. It will be understood that other types of calling devices may also be utilized in order to realize the benefits of the invention.

Pager 102 communicates with other mobile devices using radio waves to transmit messages over a wireless data gateway. Pager 102 may be an alphanumeric pager that delivers text messages to the call-receiving device, rather than simple numeric phone numbers, or may be a two-way pager.

Cell phone 104 communicates via cell tower and mobile switching center 122, which, in turn, communicates to other networks via a voice/data network switch 126. Voice/data network switch 126 further enables wireline telephone 106 and personal computer 108 to communicate with communications devices over wired and/or wireless networks. Voice/data network switch 126 may be implemented via an application programming interface that links disparate forms of communications, e.g., PSTN and Voice-over IP data.

Private Branch Exchange (PBX) wireline telephone 106 refers to a traditional wired telephone utilizing Public Switched Telephone Network (PSTN) which carries analog voice data.

Personal computer 108 may comprise a desktop, laptop, or other similar general-purpose computing device.

A called party who is the recipient of a communication attempt may receive the communication attempt on any one of call-receiving devices 110-113. Call-receiving devices 110 may include wireless and/or wireline devices and be implemented via voice and/or data technologies.

Server 114 executes the automated call acknowledgement service and may comprise any suitable high-speed microprocessor capable of handling the volume of activities provided by the features and functions of the automated call acknowledgement service and its subscriber base. Server 114 is accessible to the Internet and includes a security feature or firewall (not shown) in order to protect the integrity of the data stored therein.

The automated call acknowledgement service may be executed by a third party network provider or application service provider (ASP) and a portion of the automated call acknowledgement service may be resident in memory on a subscriber's call-receiving device as described further herein.

Figure 4:
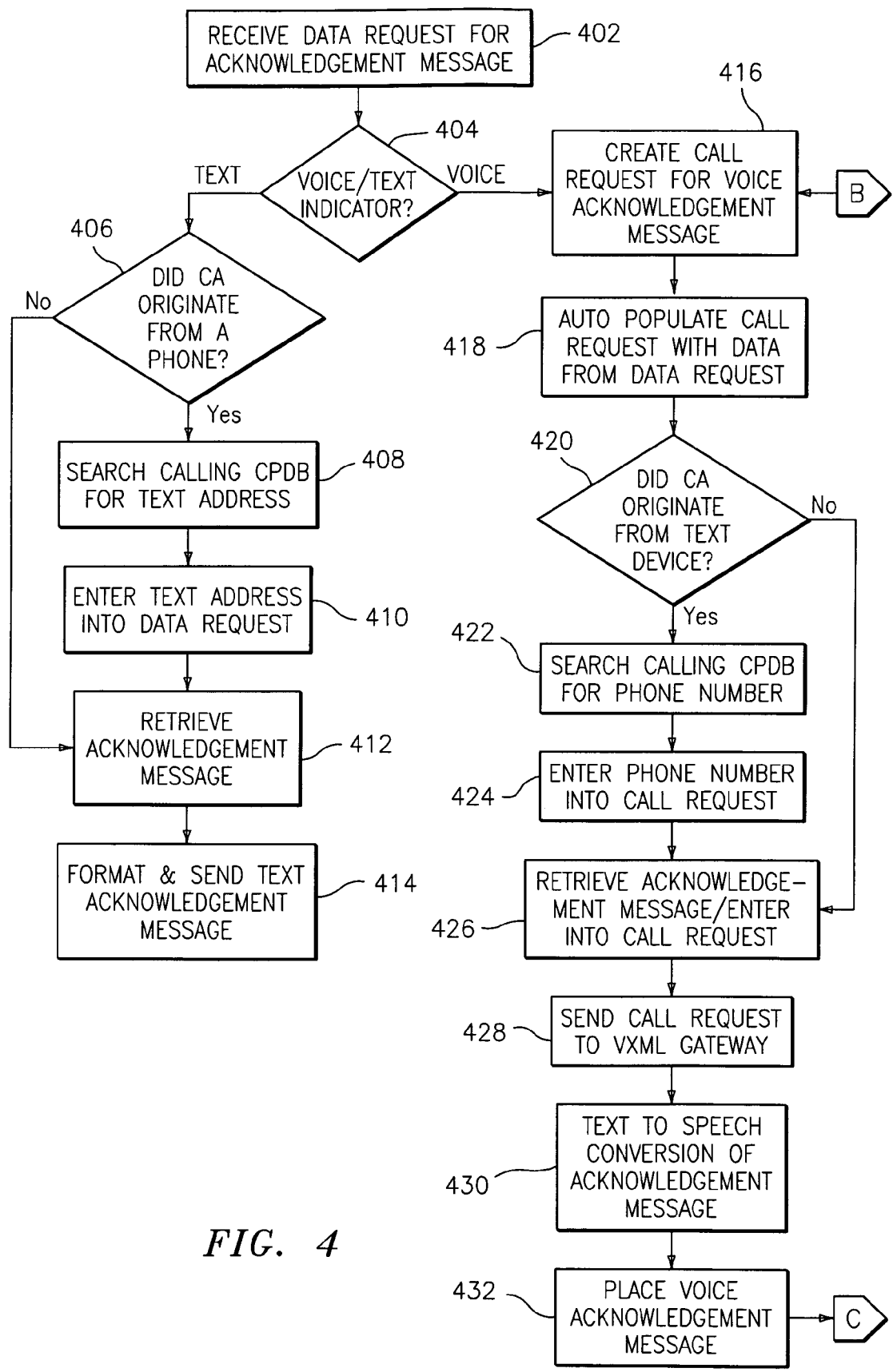
FIG. 4 is a flowchart describing the process of implementing the features of the automated call acknowledgement service in an exemplary embodiment.

Calling customer profile database 118 stores phone numbers and other addresses for calling parties that are mapped for accessing and retrieving this information as described in FIG. 4.

Called customer profile database 119 stores customer profile data for subscribers of the automated call acknowledgement service. Customer profile data includes personal information, phone numbers, other addresses, etc. Called customer profile database 119 also stores acknowledge messages defined by the subscriber, the automated call acknowledgement service, or a combination of both.

Wireless data gateways 120, 132 allows mobile digital devices to access the Internet and communicate with other wireless devices. Wireless data gateways 120, 132 route the data back and forth between mobile digital devices such as a laptop 108 or pager 102.

Mobile switching centers (MSC) 122, 124 are circuit-switching platforms that provide an interface for mobile devices to connect with voice/data network switch 126 and direct the network traffic coming in and leaving the MSC. MSCs 122, 124 serve as a network node in the wireless telecommunications network of system 100 as well as a point of access to a Public Switched Telephone Network (PSTN). A router at voice/data network switch 126 forwards the data packets received from mobile communications devices on to other networks and determines the optimal routes for these packets.

Voice services node 128 enables both calling and call-receiving devices to access the Internet via a text-to-speech and/or voice-recognition component. The party on the calling device (e.g., telephone) hears an acknowledgement message in the form of computer-generated audio output while the call-receiving party may generate an acknowledgement message utilizing a voice-recognition component. In one embodiment, voice services node 128 may be implemented via a VoiceXML Gateway.

ISP 130 represents an Internet Service Provider that provides access to the Internet for mobile digital devices such as laptop 108 or a handheld device under a subscription agreement, usually in the form of a monthly fee.

Figure 2:
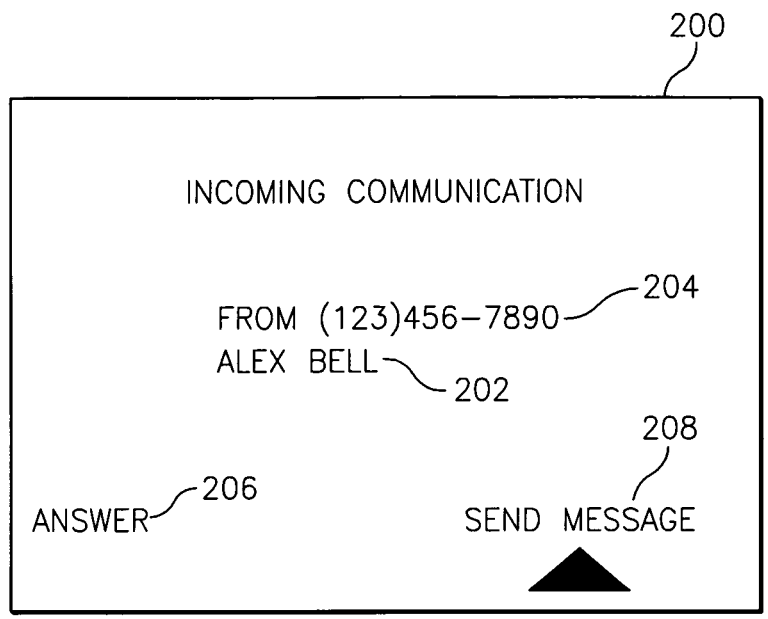
FIG. 2 is a sample screen display on a call-receiving device that is implementing the automated call acknowledgement service, indicating an incoming communication attempt has been detected in an exemplary embodiment.

The automated call acknowledgement service can be implemented in a variety of communications environments. A caller may initiate a communications attempt using any means including wireless, wireline, PDA, desktop, and the communication attempt is routed to the call-receiving device mobile switching center 124 using standard communications channels. Mobile switching center 124 is on the edge of the network between the network and the call-receiving devices 110-113. Upon receiving an incoming communication attempt, a screen display such as display 200 as shown in FIG. 2 is presented on the call-receiving device 110-113. It will be understood that the terms, called party and call-receiving party, are used interchangeably throughout this description.

The network system described in FIG. 1 is provided for illustrative purposes. It will be appreciated that a variety of different networking topologies may be utilized in implementing the automated call acknowledgement and answering services.

FIG. 2 illustrates a sample screen display 200 on a call-receiving device 110-113 upon detecting an incoming communication attempt. It is assumed that the call-receiving device's network subscription includes a caller identification service. The identity of the calling party 202 and the number of the calling party 204 is displayed on call-receiving device 110-113 via the caller identification service. Two options are displayed on screen display 200. Answer 206 and send message 208. In situations where the called party is unable or unwilling to answer the communication attempt, the send message 208 option allows the called party to acknowledge the communication attempt without connecting with the calling party. If the called party ignores the communication attempt, i.e., takes no action, the call proceeds to a voicemail system of the call-receiving party. Likewise, if the called party selects the send message 208 option, the call may proceed to a voicemail system even though the called party responds with an acknowledgement message. This is described further in FIG. 4. Upon selecting the send message option 208, a data request for an acknowledgement message is initiated and is used by the automated call acknowledgement service to generate an acknowledgement message.

Figure 3:
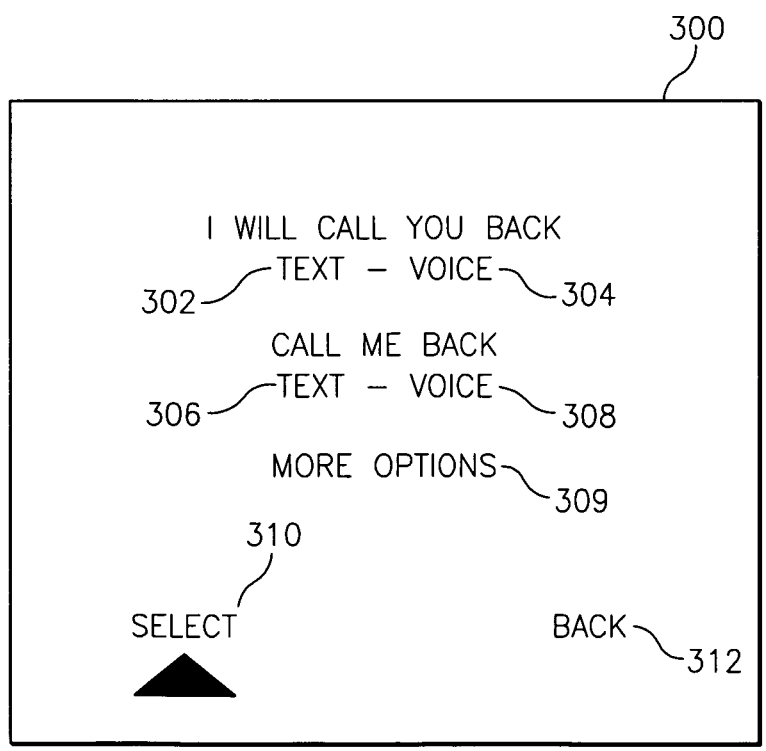
FIG. 3 is a sample screen display on a call-receiving device illustrating menu options available to a user of a call-receiving device that is implementing the automated call acknowledgement service in an exemplary embodiment.

FIG. 3 illustrates a sample screen display 300 of menu items displayed on a call-receiving device 110-113 upon selecting the send message 208 option. The acknowledgement options on menu screen display 300 include pre-configured generic statements such as: "I will call you back" 302, 304 and "Call me back" 306, 308. Additional menu options may be configured via "more options" 309. The acknowledgement options 302-308 may represent an abbreviated version of the actual text message displayed to the calling party. For example, the "Call me back" option 306, 308 may translate on the calling party device as, "Hello, this is Bob. I saw that you called. I will call you back as soon as I am able."

To activate these options 302-309, the called party utilizing a keypad, stylus, mouse, or other input device, highlights the selection and enters "select" 310. Otherwise, the called party may go back to a previous screen by selecting "back" 312.

The automated call acknowledgement service allows a called party to send an acknowledgement message by voice or text. For example, a message type "I will call you back" text 302 refers to a selection in which the call receiving party wishes to send an acknowledgement message in text form to the calling party. A call-receiving party who is familiar with the calling party may be aware that the individual calling has access to a PDA or similar device and so may decide that sending a text acknowledgement message is preferable over the voice option. Likewise, a called party may select an acknowledgement message for transmission to the calling party in voice format. The menu screen of FIG. 3 reflects a sampling of the type of options that may be provided to a calling party. Embodiments of the automated call acknowledgement service contemplate other similar menu options as well as those depicted in FIG. 3. Embodiments may include a menu screen including additional sub-menu options that are presented in response to a selection of a message type. For example, when a user selects "I will call you back" voice 304, a sub-menu is displayed on the call-receiving device 110-113 with a message "select a time for call back" followed by time-incremented choices available for selection. The resulting acknowledgement message would reflect that the call-receiving party has indicated an intent to call the calling party back in a specified number of minutes or other time frame.

As indicated above, when an incoming communication attempt is detected on a call-receiving device 110-113, the party receiving the communication attempt has three options: to answer the communication attempt, ignore the communication attempt, or send an acknowledgement message. FIG. 4 describes the implementation of the automated call acknowledgement service when the call-receiving party has selected the "send message" 208 option. The call-receiving party selects one of several options 302-309 as described in FIG. 3. At step 402, the automated call acknowledgement service receives a data request for an acknowledgement message from the call-receiving device. The data request is automatically created by the automated call acknowledgement service and contains the phone number or text address of the calling party (depending upon which mode the calling party used to place the call), the phone number or of the call-receiving party, and the message type in accordance with the option 302-309 selected by the call-receiving party (e.g., "I will call you back" and "call me back"). This information is readily available to the automated call acknowledgement service using existing communications technology. The data request also contains a voice/text indicator, provided by the call-receiving party via options 302-309, that lets the automated call acknowledgement service know how to transmit the acknowledgement message.

If the text/voice indicator specifies "text" at step 404, the automated call acknowledgement service looks at the calling party information in the data request to determine whether the communication attempt originated from a phone or computer device. If the communication attempt came from a phone at step 406, the automated call acknowledgement service searches calling party customer profile database 118 at step 408 by mapping the calling party number in the data request to an associated text address stored in database 118. The text address is entered into the data request at step 410. The automated call acknowledgement service retrieves the actual text of the selected acknowledgement message from called customer profile database 119 at step 412 by mapping the message type selected to the associated acknowledgement message text stored in called customer profile database 119. Step 412 is likewise performed if it is determined that the communication attempt originated from a text-based calling device at step 406. This resulting acknowledgement message text is formatted using existing transmissions protocols and sent in text form to the calling device at step 414.

If, on the other hand, the text/voice indicator specifies "voice" at step 404, the automated call acknowledgement service creates a call request for a voice acknowledgement message at step 416. The call request may be a simple data packet and includes a field for a delay period that may be set by default or user-customized. The delay is used to prevent premature placing of the call during a time when the calling party has not yet disconnected the call placed to call-receiving device. This might occur, for example, when the calling party is leaving a voicemail message. The call request is automatically populated with information from the data request such as calling device phone number and call-receiving device phone number at step 418. At step 420, the automated call acknowledgement service determines whether the communication attempt originated from a phone or text device by looking at the information in the data request. If the communication attempt originated from a text device, the automated call acknowledgement service searches the calling customer profile database 118 at step 422 in order to find an associated phone number for the text address. Once found, the phone number is entered into the call request at step 424. At step 426, the automated call acknowledgement service searches called customer profile database 118 for the actual acknowledgement message text associated with the acknowledgement message type selected by the call-receiving party and enters this acknowledgement message into the call request. The call request is then sent to voice XML gateway 128 at step 428 and the message is converted from text to speech at step 430. The automated call acknowledgement service then places a call to the calling party device at step 432 and the voice acknowledgement message is presented to the calling party device.

It will be understood that some of the data and functionality of the automated call acknowledgement service may be stored internally on calling devices and call-receiving devices with resident memory.

The automated call acknowledgement service provides a convenient way to acknowledge to a caller that the called party is aware of the communication attempt and to communicate information as to how or when the two parties may communicate at a future time without physically answering the communication attempt. The automated call acknowledgement service is optimally implemented in situations where the caller is not able to answer the communication attempt and has no other option but to let the communication attempt pass.

The automated call acknowledgement service may provide additional options to a called party who wishes to acknowledge an incoming caller without answering the communication attempt. For example, the automated call acknowledgement service may enable the called party to send an acknowledgement message that is presented to the caller using one of a variety of personas that is selectable by the called party. Additionally, or alternatively, the automated call acknowledgement service may provide a scheduling and/or reminder service to the called party. For example, suppose an acknowledgement contains a message informing the calling party that the called party will call the calling party back in two hours. The reminder feature of the automated call acknowledgement service may access an application on the called party's device, such as a messaging application or calendar application, and enter a corresponding reminder.

As indicated above, in response to an incoming communication attempt, the called party has the option of answering the communication attempt or sending an acknowledgement message. Additional services may be made available to the called party should the called party wish to answer the communication attempt rather than send an acknowledgement message. These services may include selecting a mode of communication in which to conduct the call. Other services may be provided while the communication session is in progress, e.g., switching mode of communication, switching applications, and call waiting options. These additional acknowledgement options and call answering-related options are collectively referred to as automated call acknowledgement and answering services and are described further herein.

Figure 5A:
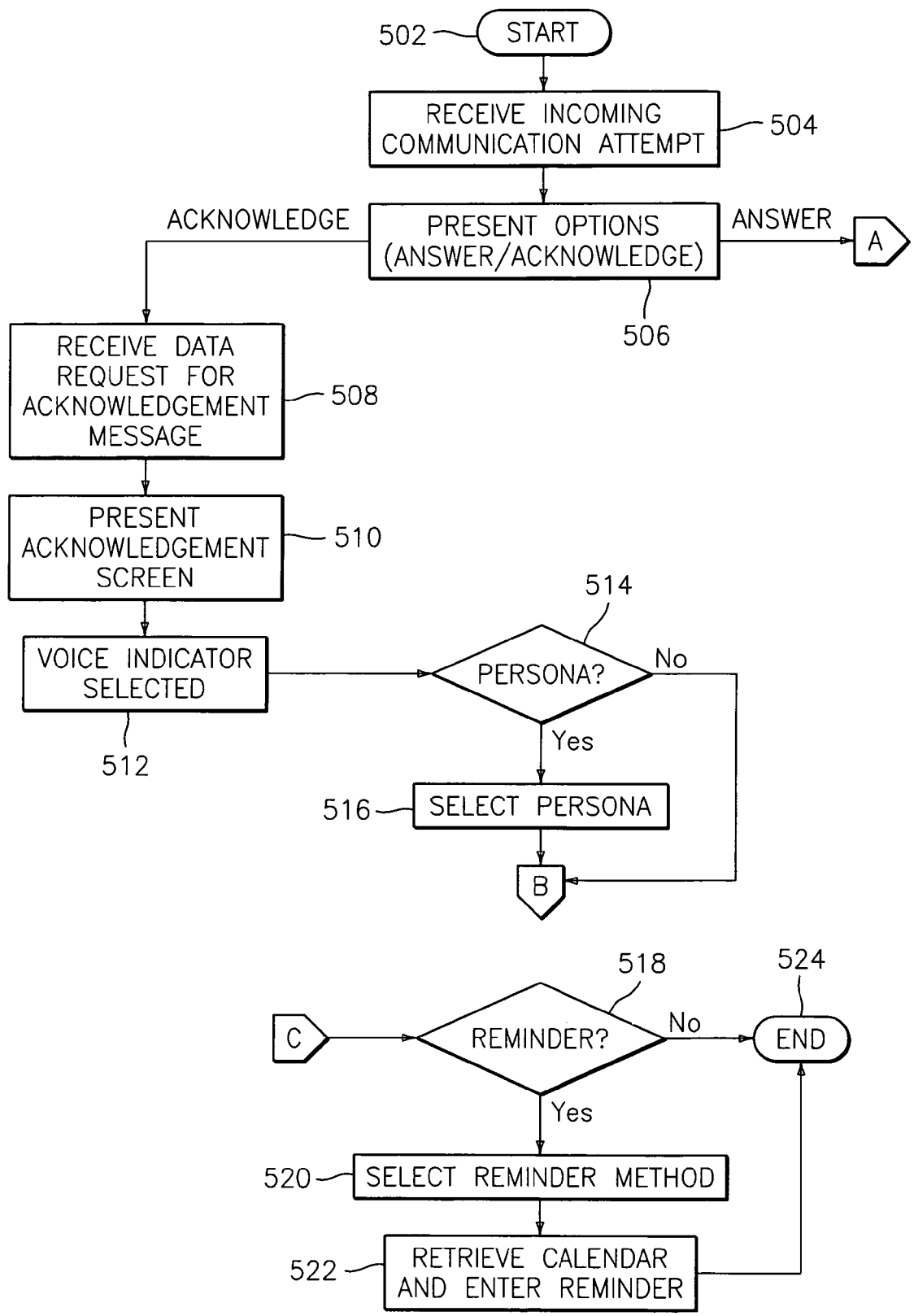
FIGS. 5A-5C is a flowchart describing processes for implementing the automated call acknowledgement and answering services in an exemplary embodiment.
Figure 5B:
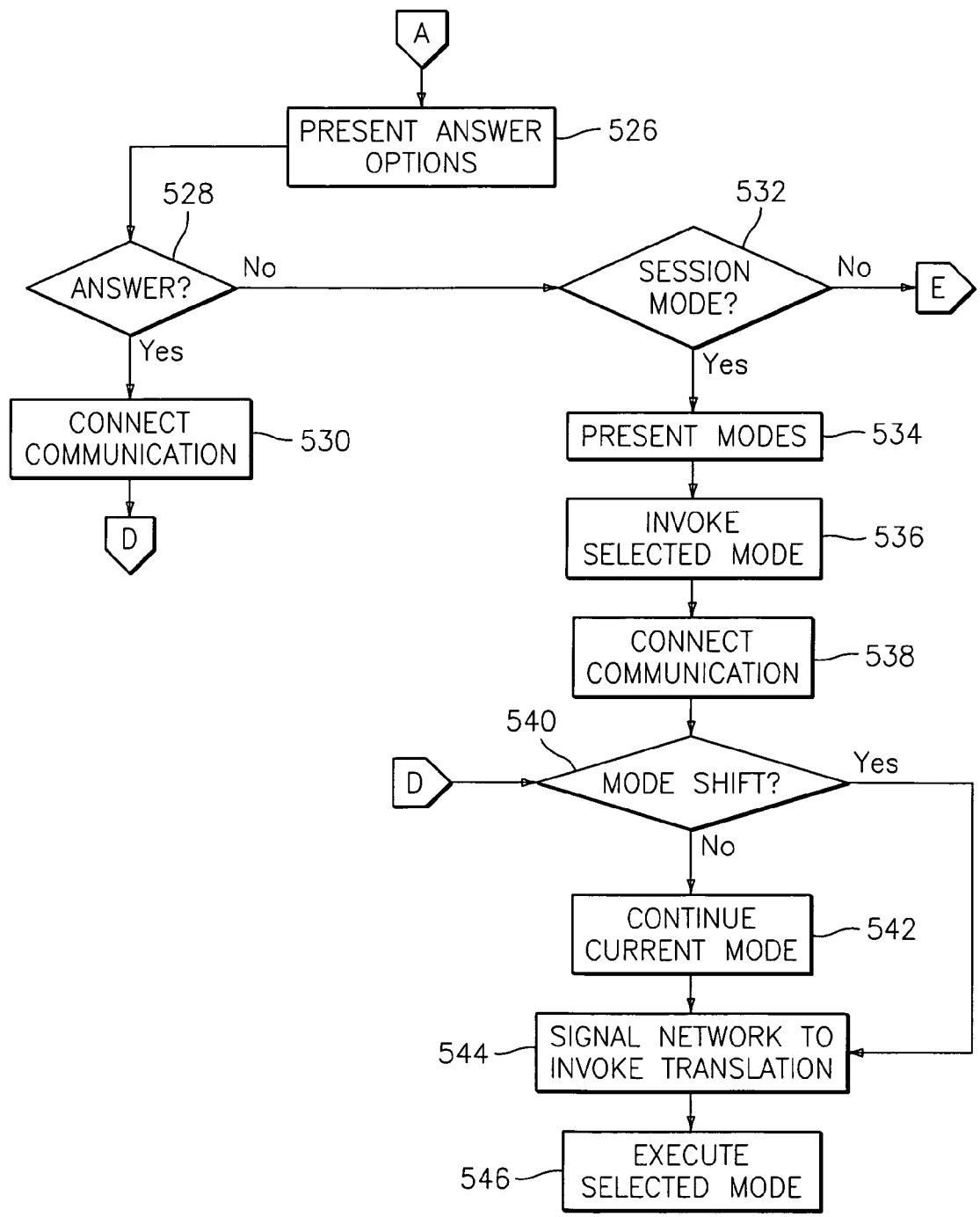
Figure 5C:
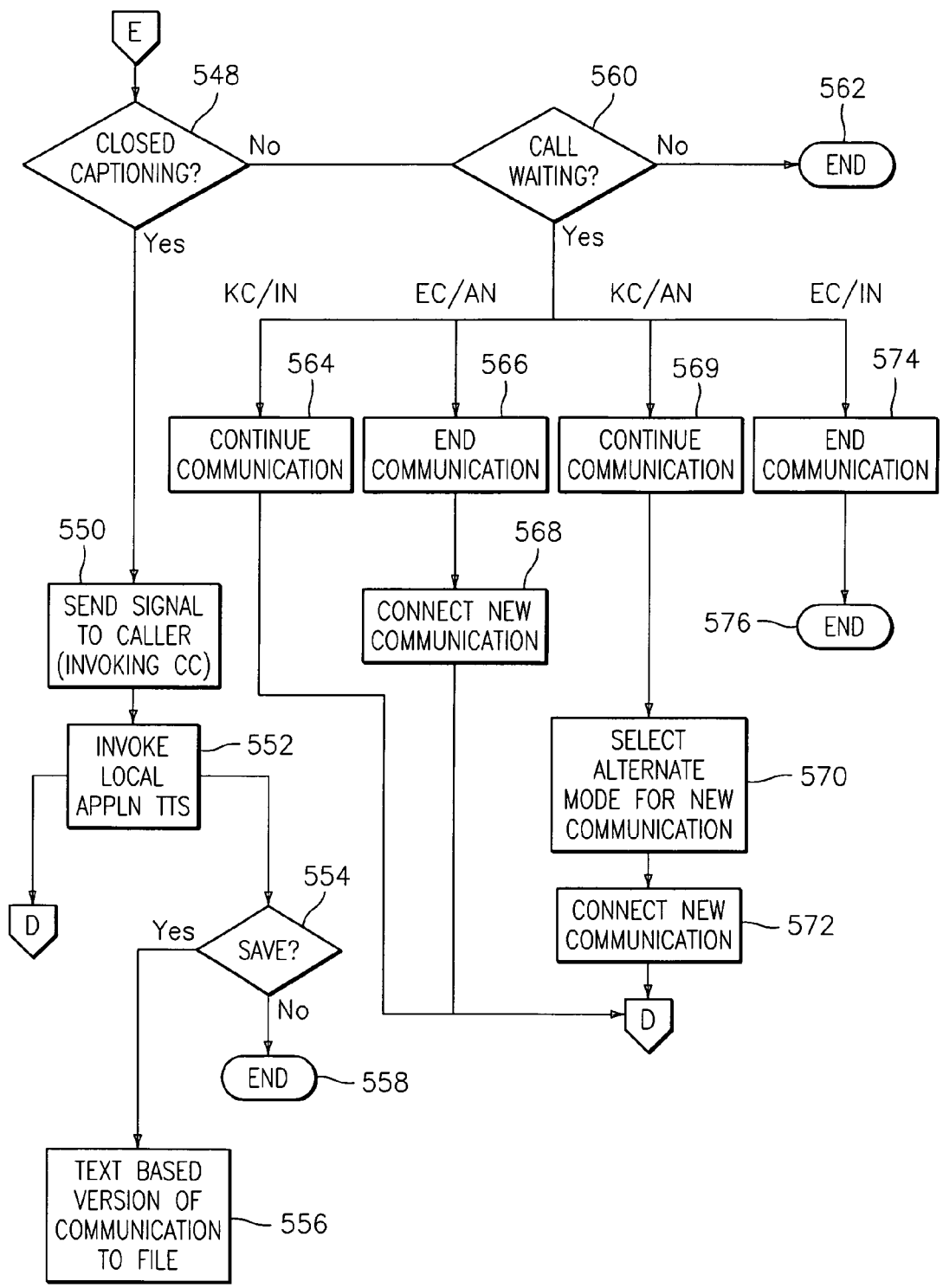

Turning now to FIGS. 5A-5C, processes for implementing the automated call acknowledgement and call-answering services will now be described in exemplary embodiments. The process described in FIG. 5A relates to the call acknowledgement features and the processes described in FIGS. 5B-5C relate to the call answering-related features.

Figure 6:
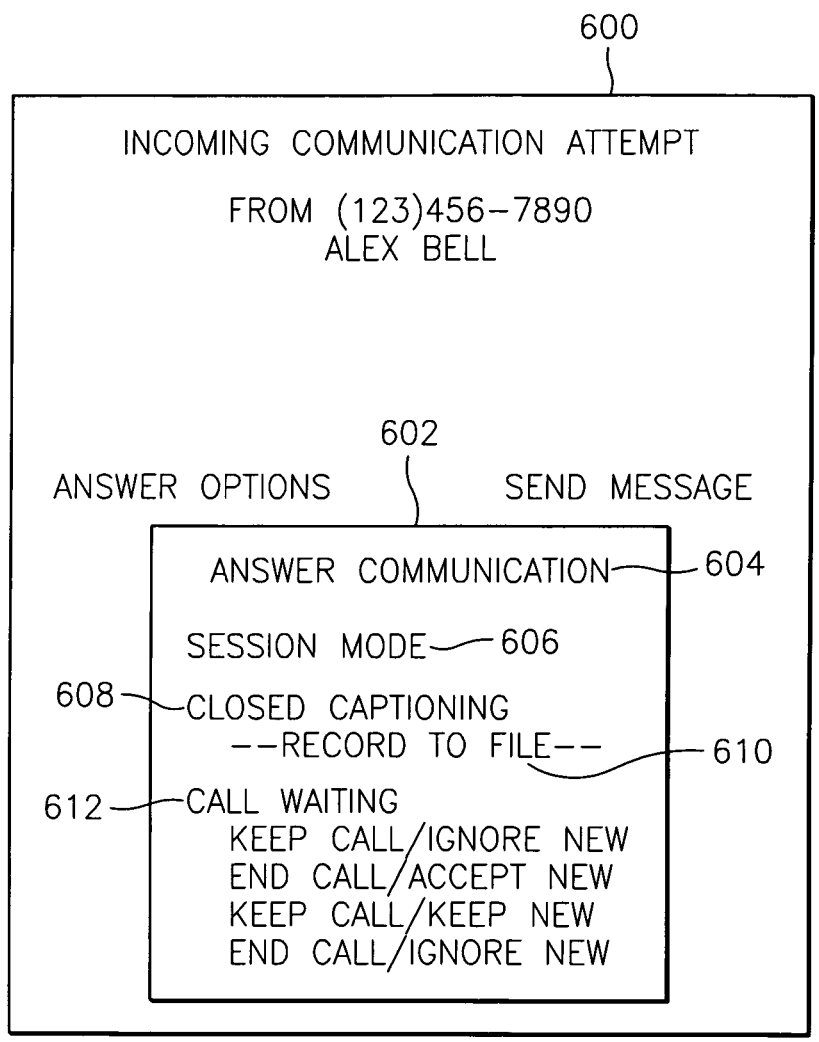
FIG. 6 is a sample screen display on a call-receiving device that is implementing the automated call acknowledgement and answering services in an exemplary embodiment.

Referring to FIG. 5A, the process begins at step 502, whereby an incoming communication attempt is detected at step 502. The automated call acknowledgement and answering services present two options for the called party via one of call-receiving devices 110-113 at step 506, namely, an acknowledgement option and an option to answer the communication attempt. If the called party wishes to answer the communication attempt, the process proceeds to FIG. 5B. Otherwise, the automated call acknowledgement and answering services receives a data request for an acknowledgement message at step 508. The request is implemented by selecting the SEND MESSAGE option on a user interface screen provided to the called party device, a sample of which is shown in FIG. 6. The request is processed in a manner similar to that described above with respect to step 402 of FIG. 4.

Figure 7:
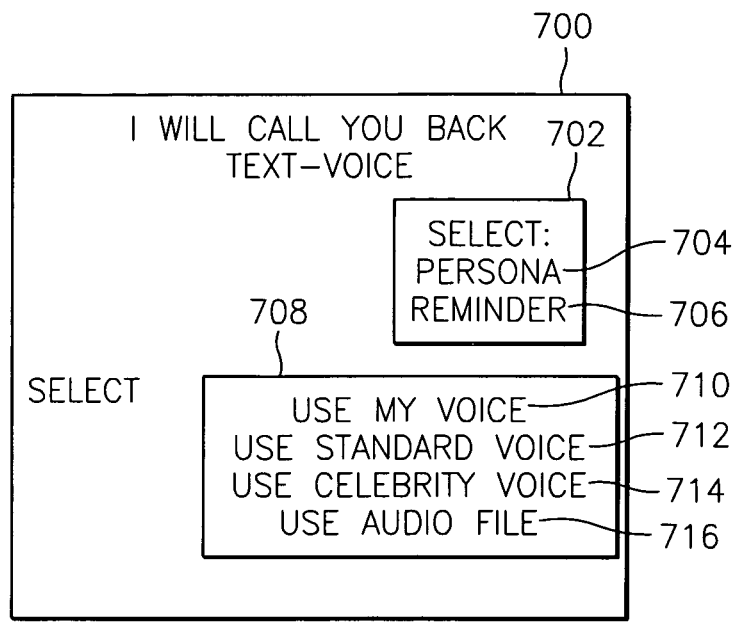
FIG. 7 is a sample screen display on a call-receiving device illustrating menu options available to a user of the call-receiving device that is implementing the automated call acknowledgement and answering services in an exemplary embodiment.

At step 510, the automated call acknowledgement and answering services presents an acknowledgement screen to the called party device, a sample of which is shown in FIG. 7. If the called party wishes to send the acknowledgement message in a voice format (e.g., via selecting the VOICE option in acknowledgement screen 700), a subwindow 702 appears, providing the called party with additional options. As shown in the subwindow 702, the called party may choose PERSONA 704 or REMINDER 706. At step 514, it is determined whether the called party has selected this option. If so, a subwindow 708 is presented to the called party that includes various persona selections to choose from. The choices may include USE MY VOICE 710, USE STANDARD VOICE 712, USE CELEBRITY VOICE 714, and USE AUDIO FILE 716, to name a few. Some of these options may further include sub-options (e.g., by selecting USE CELBRITY VOICE 714, the called party is presented with a list of different celebrity names to choose from).

At step 516, the called party selects a persona from the subwindow 710 and the process reverts back to FIG. 4 whereby steps 416-432 are performed. Alternatively, if the called party decides not to select a persona at step 514, the process reverts back to FIG. 4, steps 416-432. Called customer profile database 119 stores texts of acknowledgement messages defined by subscribers, the automated call acknowledgement and answering services, or both. The customer profile database 119 also stores pre-recorded acknowledgement messages supplied by, e.g., celebrities who lend their voices to the services, the subscriber in his/her own voice, or other audio file. Once a persona is selected, the automated call acknowledgement and answering services retrieves the corresponding message from the called customer profile database 119 and presents it to the calling party device. This option may further access the voice services node 128 in performing text-to-speech or speech-to-text conversions of the message prior to transmission, if applicable.

Once the acknowledgement message has been transmitted, the process returns to FIG. 5A, whereby the called party is presented with an option to receive a reminder to follow up with the acknowledgement (e.g., if the acknowledgement message specifies that the called party will call the calling party back at a future time). At step 518 it is determined whether the called party wishes to be reminded of the acknowledgement message. Alternatively, the reminder may be automatically scheduled for the called party without further actions on the part of the called party.

Figure 8:
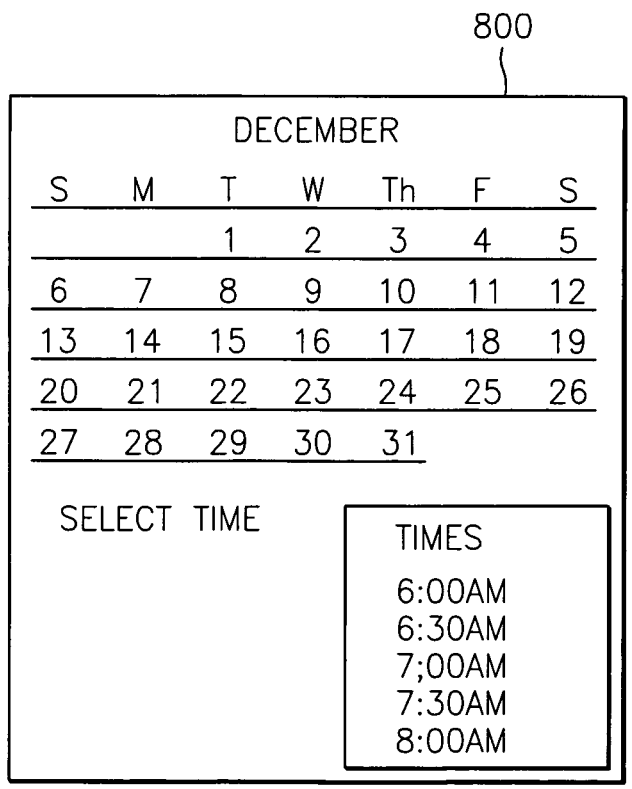
FIG. 8 is a sample screen display on a call-receiving device illustrating the reminder feature of the automated call acknowledgement and answering services in an exemplary embodiment.

If a reminder is desired at step 518 (e.g., via selected option 706 of FIG. 7), the called party may select a method of reminder (e.g., email, calendar entry, task folder entry, etc.) at step 520. If the called party selects a calendar reminder, the automated call acknowledgement and answering services retrieves a calendar application executing the called party device. This process is depicted in FIG. 8. The calendar screen 800 of FIG. 8 depicts a calendar for the month of December, along with a sub-window of times. The entry of the reminder into the calendar (including a search for "free time" on the calendar) may be automatically performed by the automated call acknowledgement and answering services or may be selectable by the called party, if desired at step 522. Upon entry of the reminder, or alternatively, if the called party does not wish to schedule a reminder at step 518, the process ends at step 524. If a reminder is scheduled for the called party, the automated call acknowledgement services provides the called party with a message (e.g., within minutes of the scheduled call back time) reminding the called party to call the party subject to the acknowledgement message in accordance with the call back time/date.

Turning back now to step 506, if the called party selects the answer option (e.g., via ANSWER OPTIONS in the user interface screen 600 of FIG. 6), the process proceeds to FIG. 5B, whereby the automated call acknowledgement and answering services presents call answering-related options in a subwindow 602 at step 526. The options include ANSWER CALL 604, SESSION MODE 606, CLOSED CAPTIONING 608 (and sub-option 610), and CALL WAITING 612 options. The answer call 604 option refers to the normal or standard mode of answering a communication attempt. The session mode 606 and closed captioning 608 modes refer to modes of communication. These are described further herein.

If the called party wishes to answer the communication attempt in a standard way with no additional answering service at step 528, the called party selects the ANSWER CALL 604 option and the communication attempt is connected between the two parties in a standardized fashion at step 530. If this option 604 is not selected, the automated call acknowledgement and answering services determines if the called party wishes to communicate with the calling party via a particular mode of communication at step 532 (e.g., via selection of SESSION MODE 606 option). If not, the process proceeds to FIG. 5C. Otherwise, the automated call acknowledgement and answering services presents available modes of communication (e.g., data mode, audio mode) at step 534 and the called party selects the desired mode. Selecting the desired mode causes the automated call acknowledgement and answering services to invoke this feature at step 536 and connect the call at step 538 whereby the communications session is conducted by the called party via the selected mode of communication. This process may be implemented using the system and processes described in U.S. patent application Ser. No. 10/184,789, entitled "SYSTEMS AND METHODS FOR PROVIDING REAL-TIME CONVERSATION USING DISPARATE COMMUNICATIONS DEVICES", filed on Jun. 28, 2002, now U.S. Pat. No. 7,065,185, which is commonly assigned to the assignees of the instant application and is hereby incorporated by reference. In such a manner, the called party may answer the communication attempt and converse with the caller in a mode that is different from the mode of the caller. For example, if the incoming communication attempt is a voice call from the caller, the recipient may choose to answer the communication attempt in data mode, resulting in a conversation in which the caller conducts the conversation in voice mode and the called party conducts the conversation in data mode, as further described in U.S. patent application Ser. No. 10/184,789, entitled "SYSTEMS AND METHODS FOR PROVIDING REAL-TIME CONVERSATION USING DISPARATE COMMUNICATIONS DEVICES", filed on Jun. 28, 2002, now U.S. Pat. No. 7,065,185.

Figure 9:
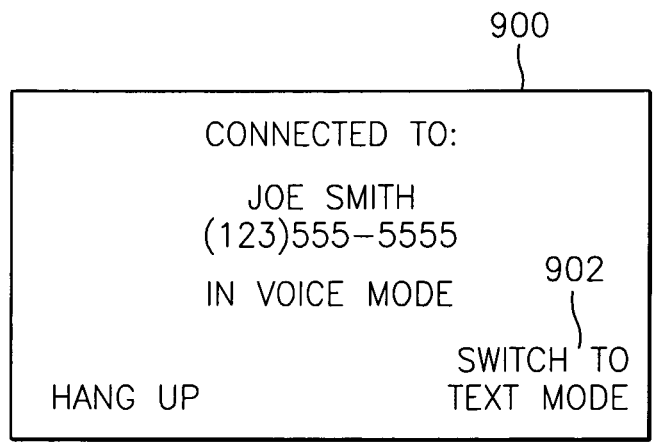
FIG. 9 is a sample screen display on a call-receiving device illustrating the mode-switching feature of the automated call acknowledgement and answering services in an exemplary embodiment.

As indicated above, the automated call acknowledgement and answering services also provides the ability for a called party to switch communication modes during a communications session (e.g., a call initiated as a voice call can be switched over to a data call. To this end, the automated call acknowledgement and answering services may provide a user interface screen that appears during the communication, a sample of which is shown in FIG. 9. The user interface screen 900 of FIG. 9 includes an option 902 that prompts the called party to select a mode of communication that is different that the mode currently utilized (i.e., mode shift). For example, as shown in screen 900, the communication is occurring in voice mode. Accordingly, the option available to the called party in screen 900 is option 902; that is, SWITCH TO TEXT MODE. At step 540, it is determined whether the called party wishes to switch the mode of communication (e.g., by selecting option 902). If not, the communication proceeds in the current mode at step 542. Otherwise, the automated call acknowledgement and answering services sends a signal to the network to invoke translation of the communication to the selected mode at step 544. The selected communication mode is then implemented at step 546. This translation may be implemented using the processes described in the aforementioned U.S. patent application Ser. No. 10/184,789.

As shown in FIGS. 5B and 5C, the mode shifting process may be implemented for other services (e.g., the standard call answering option 604 of steps 528-530, the session mode option 606 of steps 532-538, as well as the closed captioning and call waiting options of FIG. C which are described further herein).

Turning back to step 532 of FIG. 5B, if the called party does not wish to implement the session mode option, the process proceeds to FIG. 5C, whereby it is determined whether the called party has selected the CLOSED CAPTIONING 608 option at step 548. If so, the automated call acknowledgement and answering services sends a signal to the calling party informing the calling party that the called party will be communicating with the calling party via closed captioning at step 550. At step 552, the automated call acknowledgement and answering services invokes the closed captioning application on the called party device, which translates the incoming voice call into text format and presents the communication to the called party device. By this means, a text record of both sides of the conversation may be created, displayed on the device, and saved to a file.

At step 554, it is determined whether the called party wishes to save the communication (e.g., by selecting RECORD TO FILE 610 option from screen 600 of FIG. 6). If so, the automated call acknowledgement and answering services stores the communication in a file at step 556, e.g., on the called party device or may transmit the file to another location specified by the called party, if desired. If the called party does not wish to save the communication at step 554, the process ends at step 558.

Turning back to step 548, if the called party does not wish to utilize the closed captioning option, it is determined whether the called party has selected the call waiting option at step 560. The call waiting option provides the called party with choices in the event there is a new incoming communication while an existing (current) communication is already in progress. These choices include: keeping or maintaining the current communication and ignoring the new incoming communication; ending the current communication and accepting the new incoming communication; keeping the current communication and accepting the new incoming communication; and ending the current communication and ignoring the new incoming communication. If the called party wishes to keep the current communication and ignore the new incoming communication, the automated call acknowledgement and answering services takes no action, the current communication continues at step 564, and the process proceeds to step 540.

If the called party wishes to end the current communication and accept the new communication, the current call is discontinued at step 566, the incoming communication attempt is connected at step 568, and the process proceeds to step 540. If the called party wishes to keep the current communication and accept the new incoming communication, the current communication continues as normal at step 569 and the called party selects an alternate mode of communication for the new incoming communication attempt at step 570. For example, suppose that the called party device is a dual-mode communications device. The called party may be speaking to the current caller via voice communications and then select text mode for communicating simultaneously with the new incoming caller. This may be implemented by accessing the screen 600, and selecting the KEEP CALL/ACCEPT NEW option of CALL WAITING 612. The dual-mode functionality of the communications device would then initiate the communications session with the incoming communication attempt at step 572, while maintaining the current session that is ongoing with the current caller. The process then proceeds to step 540

Alternatively, if the called party wishes to end the current call and ignore the new incoming communication attempt, the called party simply terminates the call at step 574 and the process ends at step 576.

Figure 10:
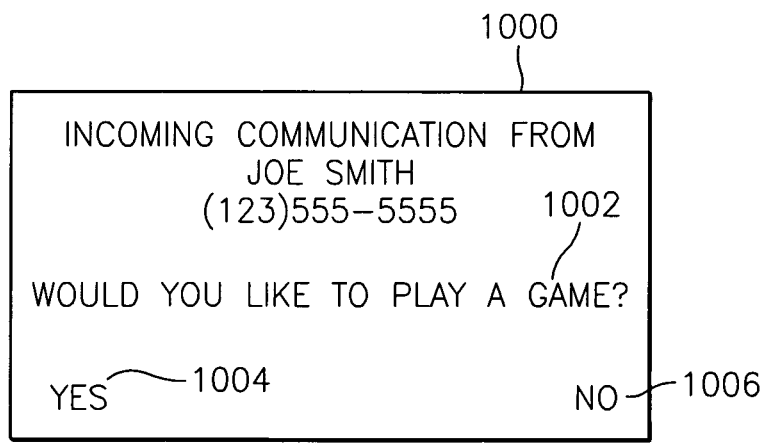
FIG. 10 is a sample screen display on a call-receiving device illustrating the interactive gaming feature of the automated call acknowledgement and answering services in an exemplary embodiment.

As indicated above, the automated call acknowledgement and answering services provides the ability for the called party to switch between applications during a communications session. A sample user interface 1000 is provided to the called party and is illustrated in FIG. 10. The called party receives a text message WOULD YOU LIKE TO PLAY A GAME? 1002 and includes response options YES 1004 and NO 1006. Upon selecting the YES 1004 option, the communication session switches to an interactive gaming application. For example, upon selecting the YES 1004 option, a data message is transmitted to the automated call acknowledgement and answering services (e.g., via server 114) to invoke the game. The automated call acknowledgement and answering services retrieves the selected application from a storage location (e.g., called customer profile database 119) and provides the called and call-receiving devices with a user interface screen for implementing the selected game. Other applications may also be enabled for use by the application switching services, e.g., communications session to word processing, Web browsing, messaging, and other types of applications. For example, while communicating with a called device via, e.g., instant messaging, the called device may initiate a local or web-based application (e.g., viewing streaming video from a web camera).

As described above, exemplary embodiments of the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While exemplary embodiments of the invention have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A method for responding to an incoming communication, comprising:
   receiving, via a cellular communication network, the incoming communication at a call-receiving device;
   presenting acknowledgement message options for providing an acknowledgement message responsive to the incoming communication over the cellular communication network, the acknowledgement message comprising one of a plurality of selectable acknowledgement messages; and
   responding to the incoming communication according to instructions associated with an option selected from the acknowledgement message options, the acknowledgement message providing information to a calling device of the incoming communication without the call-receiving device answering the incoming communication, the responding to the incoming communication according to instructions includes providing a list of voice personas to the call-receiving device, the voice personas indicative of audio recordings of the acknowledgement messages, the voice personas selectable via the call-receiving device during the incoming communication, and transmitting an audio file for a selected voice persona to the calling device during the incoming communication;

wherein the acknowledgement message options further include:
  generating, without intervention by the call-receiving device and the calling device, a reminder using data from the acknowledgement message, the reminder operable for reminding a user of the call-receiving device to call the calling device at a future time, wherein generating the reminder includes retrieving a calendar application and scheduling the reminder into the calendar application.

2. The method of claim 1, further comprising presenting communication answering-related options, the communication answering-related options providing instructions for selecting a communications mode for conducting a communications session between the call-receiving device and the calling device, the communication answering-related options including:
  shifting between a selected communications mode and another communications mode during the communications session; and
  initiating simultaneous communication sessions, each of the simultaneous communications sessions conducted in a different communications mode on the call-receiving device; and
  shifting between applications executable by the call-receiving device.

3. The method of claim 2, wherein the shifting between the selected communications mode and the other communications mode includes invoking a translator for translating the communications session from the selected communications mode to the other communications mode, wherein the selected communications mode is an audio mode and the other communications mode is a data mode.

4. The method of claim 2, wherein the applications include a messaging application and
  an interactive gaming application.

5. The method of claim 2, wherein the communication answering-related options include conducting the communications session via closed captioning, the method further comprising:
  sending a notification to the calling device that the call-receiving device is activating a closed captioning communication; and
  invoking the closed captioning application on the call-receiving device prior to connecting the incoming communication.

6. The method of claim 5, further comprising:
  creating a text record of both sides of the closed captioning communication; and
  displaying the text record on the call-receiving device.

7. The method of claim 2, wherein the shifting between applications includes receiving a request to invoke an application that is different from an application currently executing on the call-receiving device and the calling device, retrieving the requested application from a storage location, and providing the calling device and the call-receiving device with a user interface screen for implementing the requested application.

8. The method of claim 1, wherein the acknowledgement is a text message response directed to the calling device that is capable of receiving text messages, the text message response selectable from a menu on the call-receiving device from a pre-determined list of text message responses.

9. The method of claim 1, further comprising:
  establishing a connection between the call-receiving device and the calling device with respect to the incoming communication, the connection comprising a first communication session; and
  presenting communication answering-related options, the communication answering-related options providing instructions for selecting a call waiting option for another incoming communication, the call waiting option including:
  continuing the first communication session;
  initiating a connection with another calling device subject to the other incoming communication by selecting an alternate mode of communication for establishing the connection with the other calling device, the connection with the other calling device comprising a second communication session; and
  simultaneously communicating with both the calling device and the other calling device via the first and second communication sessions, the alternate mode of communication being different than a communication mode established between the calling device and the call-receiving device.

10. A system for responding to an incoming communication, comprising:
  a computer processor in communication with a calling device over a cellular communications network;
  an automated acknowledgement and answering services application executing on the computer processor, performing:
  receiving the incoming communication;
  presenting acknowledge message options for providing an acknowledge message responsive to the incoming communication over the cellular communication network, the acknowledgement message comprising one of a plurality of selectable acknowledgement messages; and
  responding to the incoming communication according to instructions associated with an option selected from the acknowledgement message options, the acknowledgement message providing information to the calling device of the incoming communication without a call-receiving device answering the incoming communication, the responding to the incoming communication according to instructions includes providing a list of voice personas to the call-receiving device, the voice personas indicative of audio recordings of the acknowledgement messages, the voice personas selectable via the call-receiving device during the incoming communication, and transmitting an audio file for a selected voice persona to the calling device during the incoming communication.

11. The system of claim 10, wherein the method further comprises presenting communication answering-related options, the communication answering-related options providing instructions for selecting a communications mode for conducting a communications session between the call-receiving device and the calling device, the communication answering-related options including:
  shifting between a selected communications mode and another communications mode during the communications session; and
  initiating simultaneous communication sessions, each of the simultaneous communications sessions conducted in a different communications mode on the receiving device; and
  shifting between applications executable by the receiving device.

12. The system of claim 11, wherein the shifting between the selected communications mode and the other communications mode includes invoking a translator for translating the communications session from the selected communications mode to the other communications mode, wherein the selected communications mode is an audio mode and the other communications mode is a data mode.

13. The system of claim 11, wherein the applications include a messaging application and an interactive gaming application.

14. The system of claim 10, wherein the acknowledgement message options include:
- generating, without intervention by the call-receiving device and the calling device, a reminder using data from the acknowledgement message, the reminder operable for reminding a user of the call-receiving device to call the calling device at a future time.

15. The system of claim 14, wherein the generating a reminder includes retrieving a calendar application and scheduling the reminder into the calendar application.

16. A non-transitory computer-readable storage medium for responding to an incoming communication, the computer-readable storage medium having computer program code embodied thereon, which when executed by a computer causes the computer to implement a method, the method comprising:
- receiving the incoming communication;
- presenting acknowledgement message options for providing an acknowledgement message responsive to the incoming communication, the acknowledgement message comprising one of a plurality of selectable acknowledgement messages; and
- responding to the incoming communication according to instructions associated with an option selected from the acknowledgement message options, the acknowledgement message providing information to a calling device of the incoming communication without a call-receiving device answering the incoming communication, the responding to the incoming communication according to instructions includes providing a list of voice personas to the call-receiving device, the voice personas indicative of audio recordings of the acknowledgement messages, the voice personas selectable via the call-receiving device during the incoming communication, and transmitting an audio file for a selected voice persona to the calling device during the incoming communication.

17. The computer-readable storage medium of claim 16, further comprising program code for presenting communication answering-related options, the communication answering-related options providing instructions for selecting a communications mode for conducting a communications session between the call-receiving device and the calling device, the communication answering-related options including:
- shifting between a selected communications mode and another communications mode during the communications session; and
- initiating simultaneous communication sessions, each of the simultaneous communications sessions conducted in a different communications mode on the call-receiving device; and
- shifting between applications executable by the call-receiving device.

18. The computer-readable storage medium of claim 17, wherein the shifting between the selected communications mode and the other communications mode includes invoking a translator for translating the communications session from the selected communications mode to the other communications mode, wherein the selected communications mode is an audio mode and the other communications mode is a data mode.

19. The computer-readable storage medium of claim 17, wherein the applications include a messaging application and an interactive gaming application.

20. The computer-readable storage medium of claim 17, wherein the communication answering-related options including conducting the communications session via closed captioning, the method further comprising:
- sending a notification to the calling device that the call-receiving device is activating a closed captioning communication; and
- invoking the closed captioning application on the call-receiving device prior to connecting the incoming communication.

21. The computer-readable storage medium of claim 16, wherein the acknowledgement message options further include:
- generating, without intervention by the call-receiving device and the calling device, a reminder using data from the acknowledgement message, the reminder operable for reminding a user of the call-receiving device to call the calling device at a future time.

22. The computer-readable storage medium of claim 21, wherein the generating a reminder includes retrieving a calendar application and scheduling the reminder into the calendar application.

* * * * *